US008487882B2

(12) United States Patent
Inaba et al.

(10) Patent No.: US 8,487,882 B2
(45) Date of Patent: Jul. 16, 2013

(54) TOUCH-PANEL DISPLAY DEVICE AND PORTABLE EQUIPMENT (75) Inventors: Toshikazu Inaba, Hyogo (JP); Hirohiko Higuchi, Tokyo (JP)

(73) Assignee: RPX Corporation, San Francisco, CA (US)

( * ) Notice: Subject to any disclaimer, the term of this patent is extended or adjusted under 35 U.S.C. 154(b) by 733 days.

(21) Appl. No.: 11/914,035

(22) PCT Filed: Jul. 7, 2006

(86) PCT No.: PCT/JP2006/313599
§ 371 (c)(1),
(2), (4) Date: Nov. 9, 2007

(87) PCT Pub. No.: WO2007/007682
PCT Pub. Date: Jan. 18, 2007

(65) Prior Publication Data
US 2009/0091542 A1    Apr. 9, 2009

(30) Foreign Application Priority Data
Jul. 8, 2005 (JP) ................................. 2005-200511

(51) Int. Cl.
*G06F 3/041* (2006.01)
(52) U.S. Cl.
USPC ............ 345/173; 345/158; 715/188; 715/863
(58) Field of Classification Search
USPC ................. 715/788, 798, 815, 800, 801, 817, 715/819, 820, 821, 822, 825, 828, 831, 835, 715/836, 838, 85, 863, 864, 866, 773; 345/156–184
See application file for complete search history.

(56) References Cited

U.S. PATENT DOCUMENTS

| 6,201,554 | B1 * | 3/2001 | Lands | 345/169 |
| 6,765,553 | B1 * | 7/2004 | Odamura | 345/156 |
| 2002/0140666 | A1 | 10/2002 | Bradski | |
| 2003/0093600 | A1 | 5/2003 | Perala et al. | |
| 2004/0008191 | A1 | 1/2004 | Poupyrev et al. | |
| 2004/0100479 | A1 * | 5/2004 | Nakano et al. | 345/700 |
| 2006/0187204 | A1 * | 8/2006 | Yi et al. | 345/158 |
| 2012/0036468 | A1 * | 2/2012 | Colley | 715/773 |

FOREIGN PATENT DOCUMENTS

| EP | 0 899 650 A2 | 3/1999 |
| EP | 0 899 650 A3 | 3/1999 |
| JP | 02153415 A | 6/1990 |
| JP | 10-240434 | 9/1998 |

(Continued)

OTHER PUBLICATIONS

Extended European Search Report issued Nov. 24, 2010 in PCT/JP2006313599.

*Primary Examiner* — Amare Mengistu
*Assistant Examiner* — Koosha Sharifi-Tafreshi
(74) *Attorney, Agent, or Firm* — Howison & Arnott, L.L.P.

(57) ABSTRACT

A touch-panel display device in which a plurality of operation items are displayed in arrangement includes a tilt detector detecting an inclination of a portable equipment, and controls a display ratio of the plurality of operation items according to the direction of an inclination detected by the tilt detector and displays an operation item in large scale.

7 Claims, 5 Drawing Sheets (a)            (b)            (c)            (d)

INCLINATION IS    INCLINE TO      INCLINE FAR AWAY    LEVEL OUT
NOT DETECTED      LOWER LEFT

| | FOREIGN PATENT DOCUMENTS | | | | |
|---|---|---|---|---|---|
| JP | 2000194469 A | 7/2000 | JP | 2006-236355 | 9/2006 |
| JP | 2002-41205 | 2/2002 | WO | WO 01/27753 | 4/2001 |
| JP | 2002-140159 | 5/2002 | WO | WO 0127735 A1 * | 4/2001 |
| JP | 2002-261918 | 9/2002 | WO | WO 01/86920 A2 | 11/2001 |
| JP | 2003-511786 | 3/2003 | WO | WO 01/86920 A3 | 11/2001 |

* cited by examiner

| INDICATE ENLARGED PORTION BY CIRCLE | INCLINATION | | | STATE OF PORTABLE APPLIANCE (VIEWED FROM THE SIDE) |
|---|---|---|---|---|
| | LEFTWARD | | RIGHTWARD | |
| FAR AWAY FROM OPERATOR | | | | |
| INCLINATION | | | | |
| TOWARD OPERATOR | | | | |
| STATE OF PORTABLE APPLIANCE (VIEWED FROM UNDER) | | | | |

FIG.6

TOUCH-PANEL DISPLAY DEVICE AND PORTABLE EQUIPMENT

TECHNICAL FIELD

The present invention relates to a touch-panel display device which controls the display size of operation items of the touch-panel, and to a portable equipment on which the touch-panel display device is mounted.

BACKGROUND ART

Recently, it shows a marked trend toward miniaturization of a variety of information apparatus for carrying thereof. In these portable equipments, there has been heretofore suggested technologies to scroll pages by detecting an inclination of such equipment using a tilt sensor, or to perform a page feed by detecting an acceleration or an impact occurred when the device is lightly swung by an acceleration sensor (e.g. see Patent Document 1). This method allows control of a display screen thereof even by one hand. However, the conventional technology operates the display screen by limited gestures such as swinging or tilting the portable equipment, and its intended control is limited to those such as a scroll of pages and a page feed. Further, an aspect of the operation thereof is of little practical use.
Patent Document 1: JP-A2002-140159

The present invention has been made to solve the above-mentioned problems, and an object of the present invention is to provide a touch-panel display device, in which, on a touch-panel screen of the display device displaying a plurality of operation items at once, the display device displays an operation item to be operated in such a way as to be easy to touch thereon by inclining the portable equipment.

DISCLOSURE OF THE INVENTION

The touch-panel display device according to the present invention is a touch-panel display device mounted on a portable equipment, and displays in arrangement a plurality of operation items, wherein the touch-panel display device includes a tilt detector that detects which direction the portable equipment is inclined, and controls a display ratio of the plurality of operation items according to the direction of the inclination detected by the tilt detector to display an operation item to be operated in large scale.

This facilitates a touch operation for many items by applying the touch-panel display device to a display screen of an extremely small-sized portable equipment such as a cellular phone. Particularly, since, due to its portable size, it necessarily follows a small-sized touch-panel screen, an inclination of the touch-panel display device allows an enlargement of an effective area of a button to be operated on the touch panel. This provides an easy view of a display button that originally ought to be small, and further, an easy touch with a fingertip, which enables improvement of the operability of the small portable equipment.

BEST MODE FOR CARRYING OUT THE INVENTION

An embodiment of the present invention will now be described with reference to the accompanying drawings in order to explain the present invention in more detail.

First Embodiment

Figure 1:
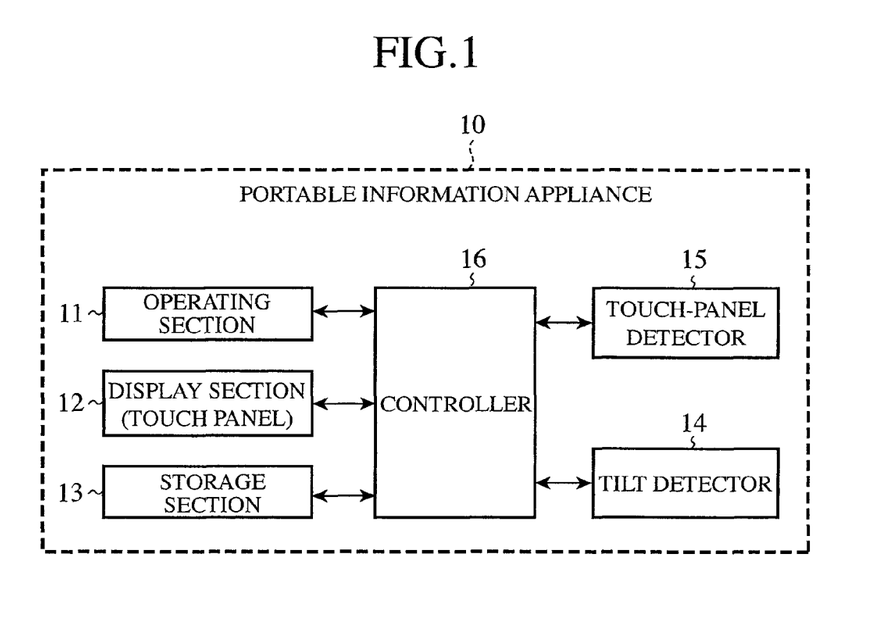
FIG. 1 is a block diagram showing a functional configuration of a portable equipment to which the touch-panel display device according to the first embodiment of the present invention is applied.
Figure 2:
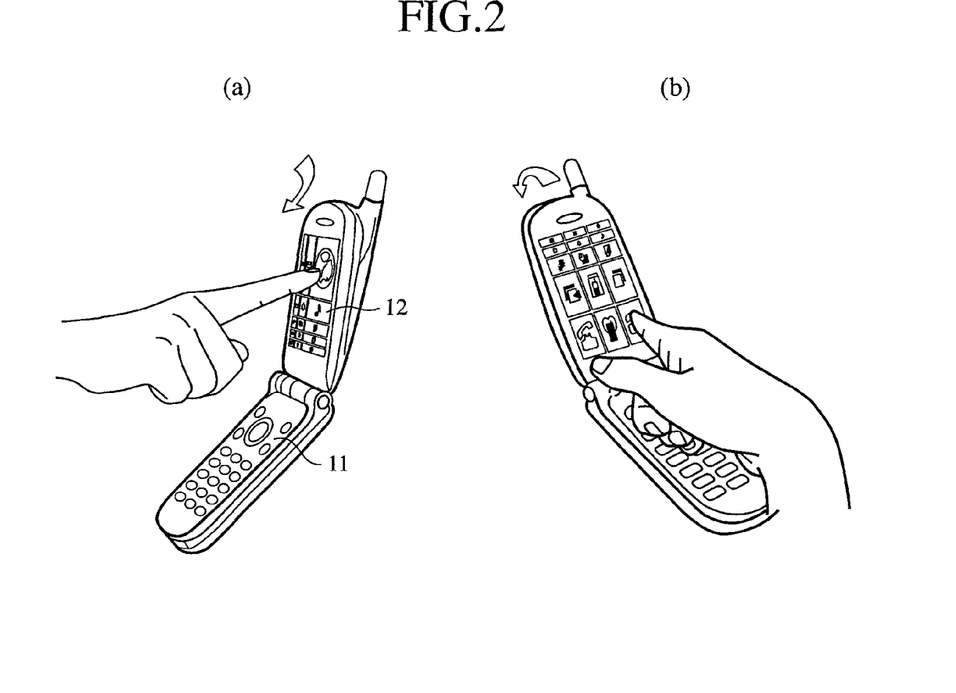
FIG. 2 is an oblique view showing a service image of the touch-panel display device according to the first embodiment.

FIG. 1 is a block diagram showing a functional configuration of a portable equipment to which a touch-panel display device according to the first embodiment of the present invention is applied. FIG. 2 is an oblique view showing a service image of a cellular phone to which the touch-panel display device is applied.

Referring to the figures, a portable information equipment 10 includes an operating section 11; a display section 12; a storage section 13; a tilt detector 14; a touch-panel detector 15; and a controller 16, as constituents relating to a function of the touch-panel display device of the present invention. On the operating section 11 keys are arranged, with which an operator selects and operates a function thereof. The display section 12 is a means displaying image information and character information for use in the portable equipment 10 by means of liquid crystals. Here, the display section 12 constitutes a touch panel on which a plurality of operation items are arranged. The storage portion 13 stores touch-panel screens, a variety of screen data, and display programs. The tilt detector 14 is a means detecting the direction of an inclination of the portable equipment 10 by an acceleration sensor. The touch-panel detector 15 is a means detecting where an operator touched of a portion on the display section 12 touched with his/her finger. The controller 16 is a means, which is composed of a CPU, a microcomputer, and programs, and which controls portions of the portable equipment 10 based on an operation program.

Figure 3:
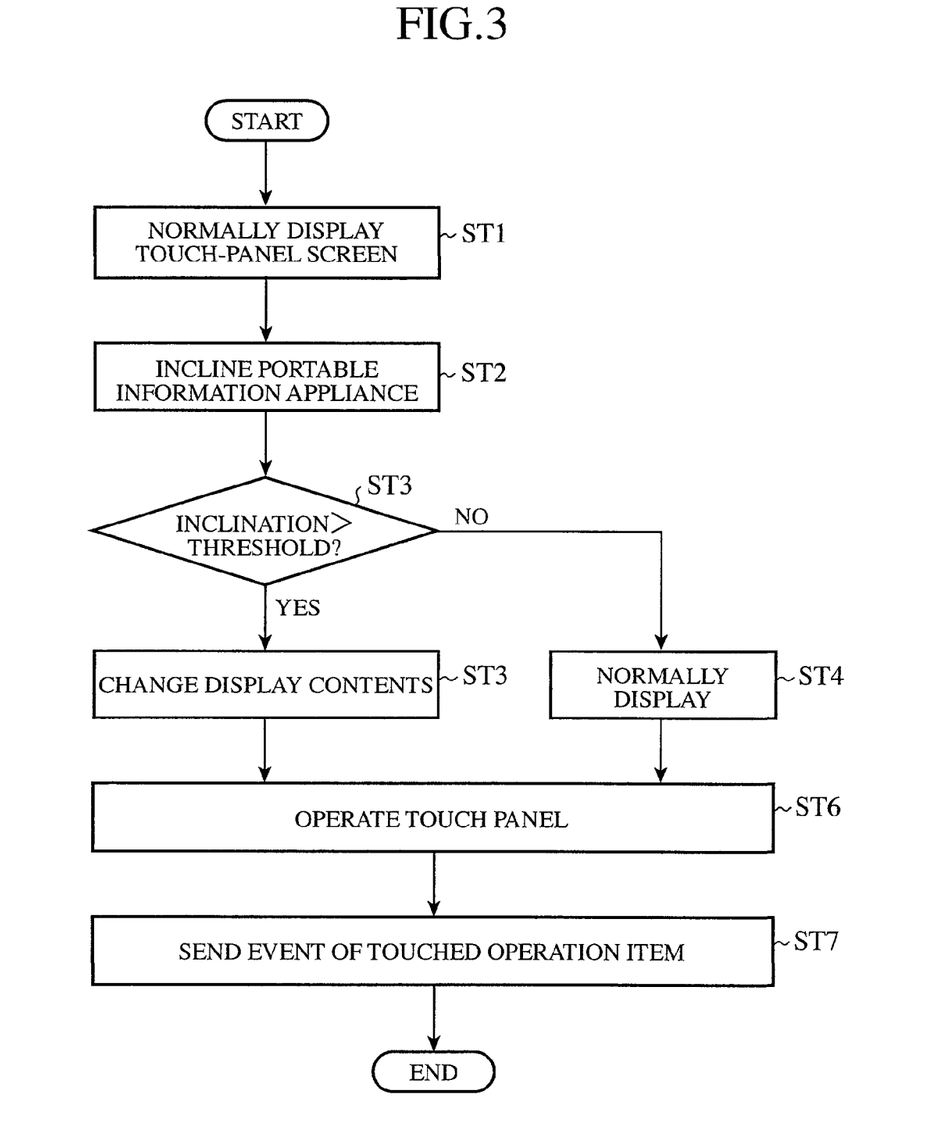
FIG. 3 is a flowchart showing a control procedure of the touch-panel display device.

The operation of the touch-panel display device will now be explained below. FIG. 3 is a flowchart showing a control procedure of the touch-panel display device.

Figure 4:
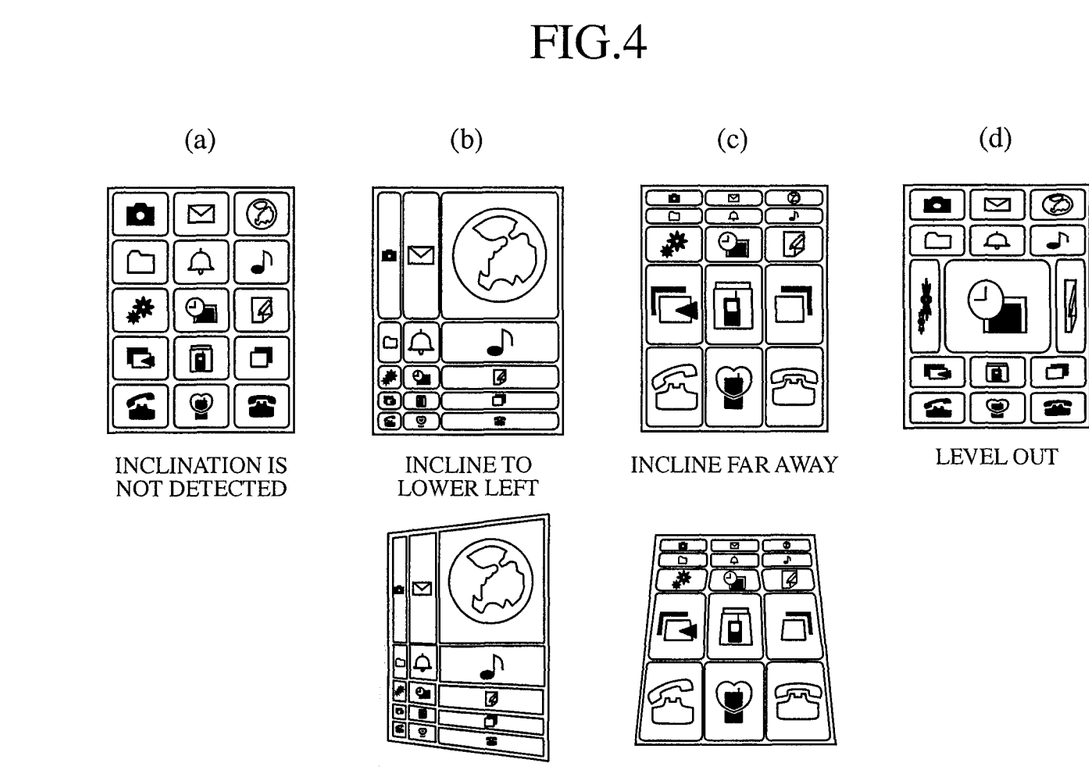
FIG. 4 is an explanatory diagram showing an example of a display style of the touch panel.

First of all, data defining a touch-panel screen is read out from the storage section 13 by an key operation of the operating section 11 to display it on the display section 11 (step ST1). In such a situation, the touch-panel screen displays a normal display screen in which a plurality of operation items each having the same size are arranged as shown in FIG. 4(a). An operator inclines the portable information appliance 10 before operating the touch panel thereof (step ST2). The direction of an inclination thereof is detected by the tilt detector 14 (step ST3), and, it is judged that the inclination does not exceed threshold, the touch-panel display device keeps the initial normal display displaying (step ST4).

Otherwise, it is judged in step ST3 that the inclination exceeds the threshold, the degree of the inclination is sent to the controller 16, and the display section 12 changes a display style (step ST5) according to inclination information fed by the controller 16. An explanation of the display style at that time is made referring to FIG. 4. When the portable equipment 10 is inclined to the lower left with respect to the initial position, a display ratio is controlled such that a certain operation item displayed on the upper right of the touch-panel screen is preferentially enlarged as shown in FIG. 4(b). The figures of the upper stage show a state of the screen viewed from a vertical direction, and the figures of the lower stage show a state of the screen viewed from a direction before inclination of the screen. Further, FIG. 4(c) shows a display style of a touch-panel screen, displayed when the upper part thereof is inclined far away from an operator with respect to the initial position, and the display ratio is changed such that operation items located in the lower side are preferentially enlarged. FIG. 4(d) shows a display style of the touch-panel screen, when the touch-panel screen is made level with the initial position displayed in step ST1, and the display ratio is changed so that only an operation item located in the center is preferentially enlarged. In this connection, when a first state in step ST1 is in a horizontal state of the touch-panel screen, one can revert to the display ratio shown in FIG. 4(d) once the screen is inclined at an arbitrary angle and then returns the screen to the horizontal position. An exemplary relation between the direction of an inclination of the aforesaid portable equipment 10 and the display style of the touch-panel screen are shown in FIG. 5.

Subsequently, after the display style of the touch-panel screen is fixed in steps ST4 and ST5, an operator touches on an operation item to be operated with his/her fingertip (step ST6). At that time, the enlarged display of the operation item warrants an accurate touch to the operation item and is secured from a mis-operation. If the touch-panel detector 15 judged that the operation performed to the operation item is valid, the controller 16 sends an event corresponding to the operation item (step ST7), and the process proceeds to the corresponding processing step.

Heed should be given in step ST5 to that the display ratio is changed, and accordingly the operation item intended for (button) is displayed in large scale. However, where, in some cases, the touch-panel screen may disappear from sight of an operator before inclining the portable equipment or the direction of a hand thereof holding the device goes unnatural. The next touch operation could sometimes become difficult. In such a situation, the display device has only to be provided with a control function of maintaining by a timer an operation display state, when detected, e.g. that the operation item has been displayed in large scale only for a predetermined period of time (a period of time determined by allowing for the range during which a touch operation can be subsequently carried out). By doing so, even if the touch-panel screen is returned to the former attitude, the display device keeps the enlarged screen displaying, providing a condition where a touch operation can be easily performed. Further, when no touch operation is performed after the screen is returned to the former attitude, and a predetermined time elapsed, the display device may be controlled such that the touch-panel screen is gradually returned to the original display state (equal display ratio) before the device is inclined.

Figure 5:
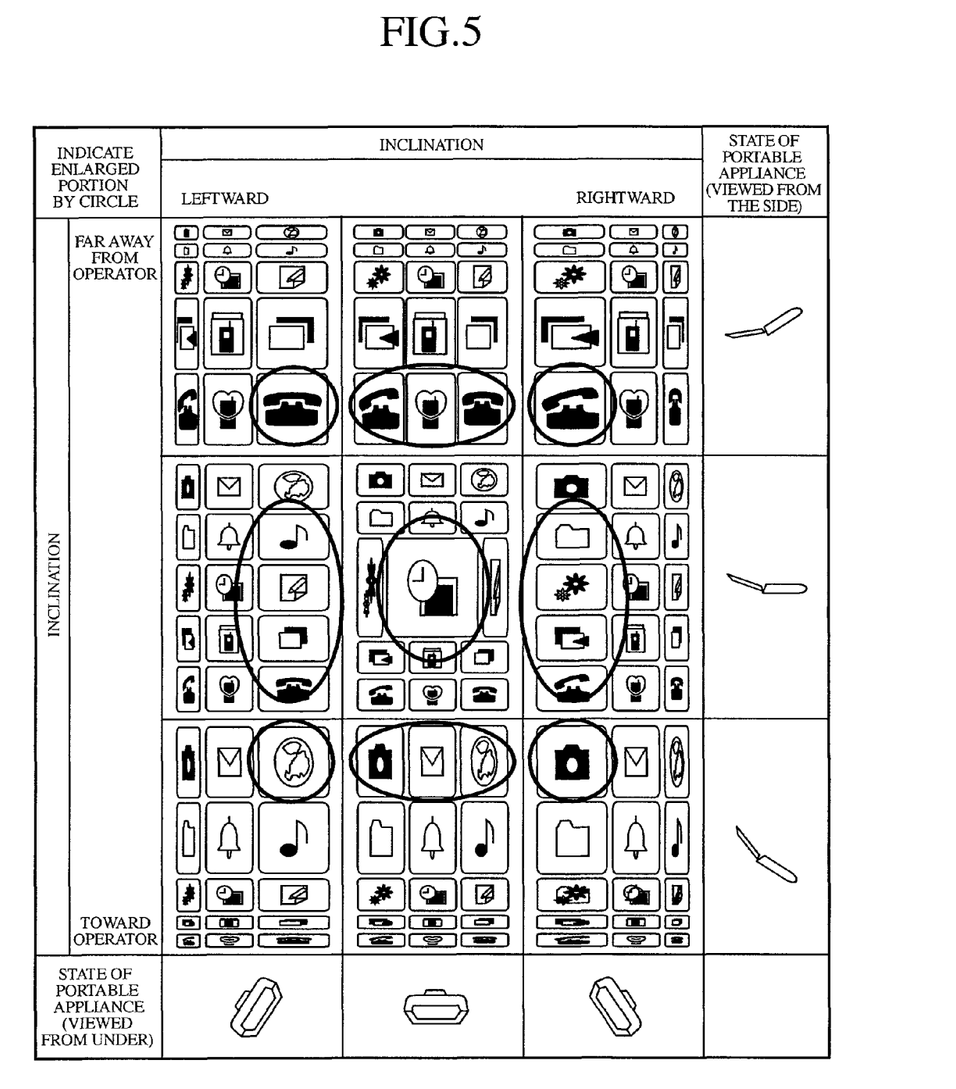
FIG. 5 is an explanatory diagram showing a relationship between the direction of an inclination and a display style of a touch-panel screen of the portable equipment.
Figure 6:
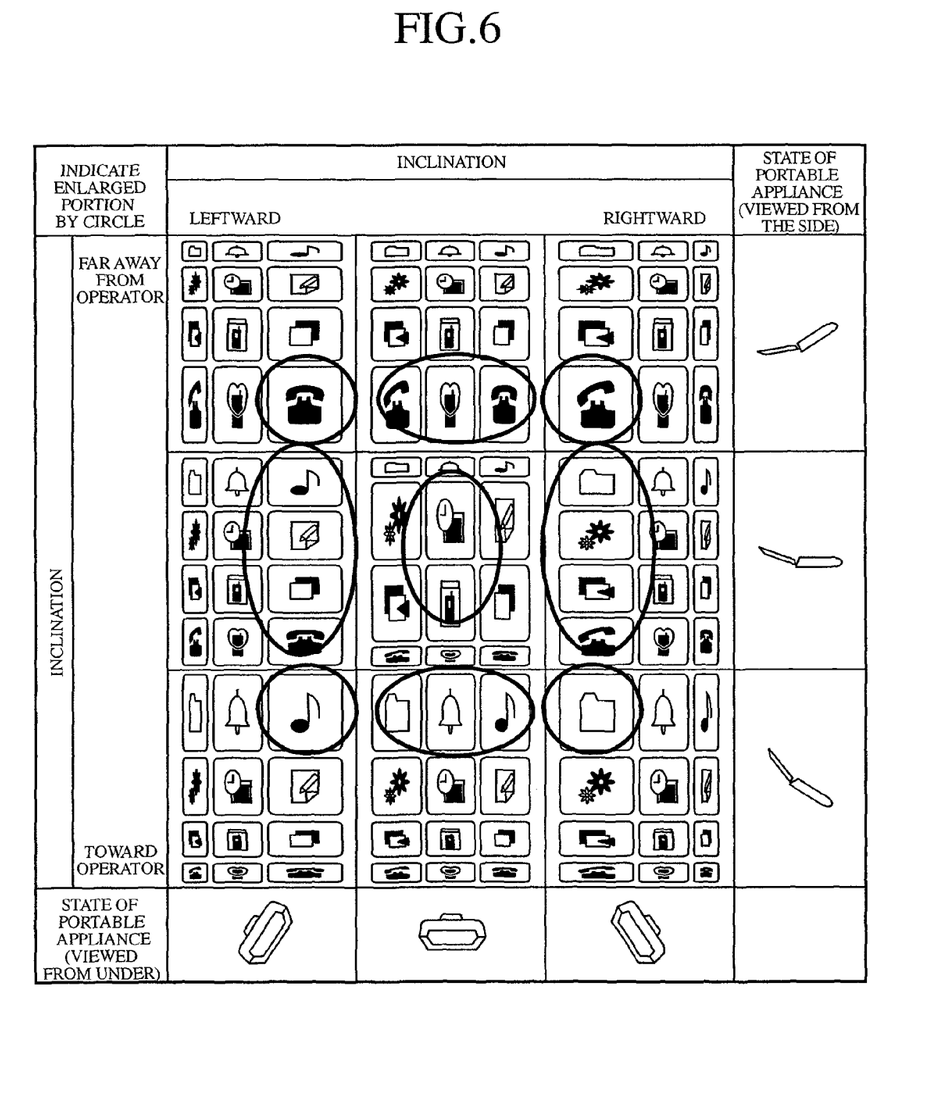
FIG. 6 is an explanatory diagram showing the direction of an inclination and the other arrangement of a display style of a touch-panel screen of the portable equipment.

FIG. 5 shows the case where the touch-panel screen displays five lines by three rows. Alternatively, FIG. 6 shows an example of four lines by three rows. In the above, FIG. 5 is an example in which the length is changed in plural lines, and FIG. 6 is an example in which the length is changed every line.

As mentioned above, according to the first embodiment, the display device is arranged to include the tilt detector detecting an inclination of the display device, control a display ratio according to the direction of the inclination detected by the tilt detector, and display an operation item to be operated in large scale. This enables a display of many operation menu items (touch buttons) in a display section having a small-sized screen. In particular, when the display device is applied to a portable equipment, which is miniaturized like a cellular phone, even though a display area of its display portion is limited, an inclination of the display device leads to an enlargement of an effective area of the button to be operated. This becomes easy to view, and further, secures a button area for contact with a finger tip, which permits an accurate operation. Furthermore, it is enough for a tilt operation and a button operation with a finger to carry out by one hand, which makes a cellular phone further convenient for use by applying the display device to the cellular phone.

INDUSTRIAL APPLICABILITY

As discussed above, since the touch-panel display device according to the present invention allows at will an enlargement and a change of a necessary effective area of the operating button thereof by inclining the portable equipment mounted on the touch-panel display device, the touch-panel display device is suitable for a display screen of an extremely small-sized portable equipment like a cellular phone.

The invention claimed is:

1. A touch-panel display device that is mounted on a portable equipment, comprising:
   a display section configured to display a plurality of operation items;
   a tilt detector configured to detect an inclination of the portable equipment;
   a controller configured to control a display ratio of the plurality of operation items to be displayed by the display section according to a direction of the inclination detected by the tilt detector;
   wherein the controller controls the display ratio to display an operation item of the plurality of operation items in a larger scale in accordance with the detected inclination of the portable equipment;
   wherein the operation items are displayed in the larger scale for a pre-determined period of time such that when the portable equipment is returned to a former attitude within the pre-determined period of time, the display section maintains the operation items displayed in the larger scale;
   wherein the controller controls the display ratio to display the plurality of operation items in an equal display ratio prior to the tilt detector detecting the inclination of the portable equipment;
   wherein the tilt detector is configured to detect a level-out position of the portable equipment and in response, at least one operational item located in a center of the display section is displayed in the larger scale; and
   wherein the tilt detector is further configured to detect an inclination direction of the portable equipment, and the display section displays at least one operational item located opposite the inclination direction in the larger scale.

2. A portable equipment comprising:
   a display section having a touch-panel screen configured to display a plurality of operation items;
   a tilt detector configured to detect an inclination of the portable equipment;
   a controller configured to control a display ratio of the plurality of operation items to be displayed by the display section according to a direction of the inclination detected by the tilt detector;

wherein the controller controls the display ratio to display an operation item of the plurality of operation items in a larger scale in accordance with the detected inclination of the portable equipment, wherein the operation items are displayed in the larger scale for a predetermined period of time such that when the portable equipment is returned to a former attitude within the pre-determined period of time, the touch-panel screen maintains the operation items displayed in the larger scale;

wherein the controller controls the display ratio to display the plurality of operation items in an equal display ratio prior to the tilt detector detecting the inclination of the portable equipment;

wherein the tilt detector is configured to detect a level-out position of the portable equipment and in response, at least one operational item located in a center of the display section is displayed in the larger scale; and wherein the tilt detector is further configured to detect an inclination direction of the portable equipment, and the display section displays at least one operational item located opposite the inclination direction in the larger scale.

3. The touch-panel display device according to claim 1, wherein the controller controls the display ratio to display an operation item located on a center of the plurality of operation items in the larger scale when the tilt detector detects a horizontal condition of the portable equipment after detecting an inclined condition of the portable equipment.

4. The portable equipment according to claim 2, wherein the controller controls the display ratio to display an operation item located on a center of the plurality of operation items in the larger scale when the tilt detector detects a horizontal condition of the portable equipment after detecting an inclined condition of the portable equipment.

5. A display method for a portable equipment having a touch-panel display, comprising steps of:

controlling a display ratio of a plurality of operation items to be displayed on the touch-panel display to display the plurality of operation items in an equal display ratio;

detecting an inclination of the portable equipment;

controlling the display ratio of the plurality of operation items to be displayed on the touch-panel display to display an operation item of said plurality of operation items in a larger scale in accordance with the detected inclination of the portable equipment;

wherein the operation items are displayed in the larger scale and the activation for a pre-determined period of time such that when the portable equipment is returned to a former attitude within the pre-determined period of time, the touch-panel display maintains the operation items displayed in the larger scale;

detecting a level-out position of the portable equipment and in response, controlling the display ratio to display at least one operational item located in a center of the plurality of operational items in the larger scale;

detecting an inclination direction of the portable equipment; and controlling the display ratio to display at least one operational item located opposite the inclination direction in the larger scale.

6. The display method according to claim 5, further comprising a step of:

controlling the display ratio to display an operation item located on a center of the plurality of operation items in the larger scale when detecting a horizontal condition of the portable equipment after detecting an inclined condition of said portable equipment.

7. The display method according to claim 5, further comprising:

controlling the display ratio to return the plurality of the operation items to an equal display ratio from the larger scale, when no touch operation is detected within the pre-determined period of time.

* * * * *

UNITED STATES PATENT AND TRADEMARK OFFICE
CERTIFICATE OF CORRECTION

Page 1 of 2

PATENT NO.         : 8,487,882 B2
APPLICATION NO.    : 11/914035
DATED              : July 16, 2013
INVENTOR(S)        : Inaba et al.

It is certified that error appears in the above-identified patent and that said Letters Patent is hereby corrected as shown below:

On the Title Page, Column 1, in Item (52), under "U.S. Cl.", Line 1, delete "715/188;" and insert -- 715/788; --, therefor.

In the Drawings

Delete drawing sheet 2 of 5 and substitute the attached drawing sheet 2 therefor.

In the Specification

In Column 2, Line 53, delete "section 11" and insert -- section 12 --, therefor.

Signed and Sealed this
Twenty-sixth Day of August, 2014

Michelle K. Lee
*Deputy Director of the United States Patent and Trademark Office*

FIG.3